March 24, 1953     E. I. VALYI     2,632,508
AUTOMATIC TIMING SYSTEM
Filed June 8, 1951
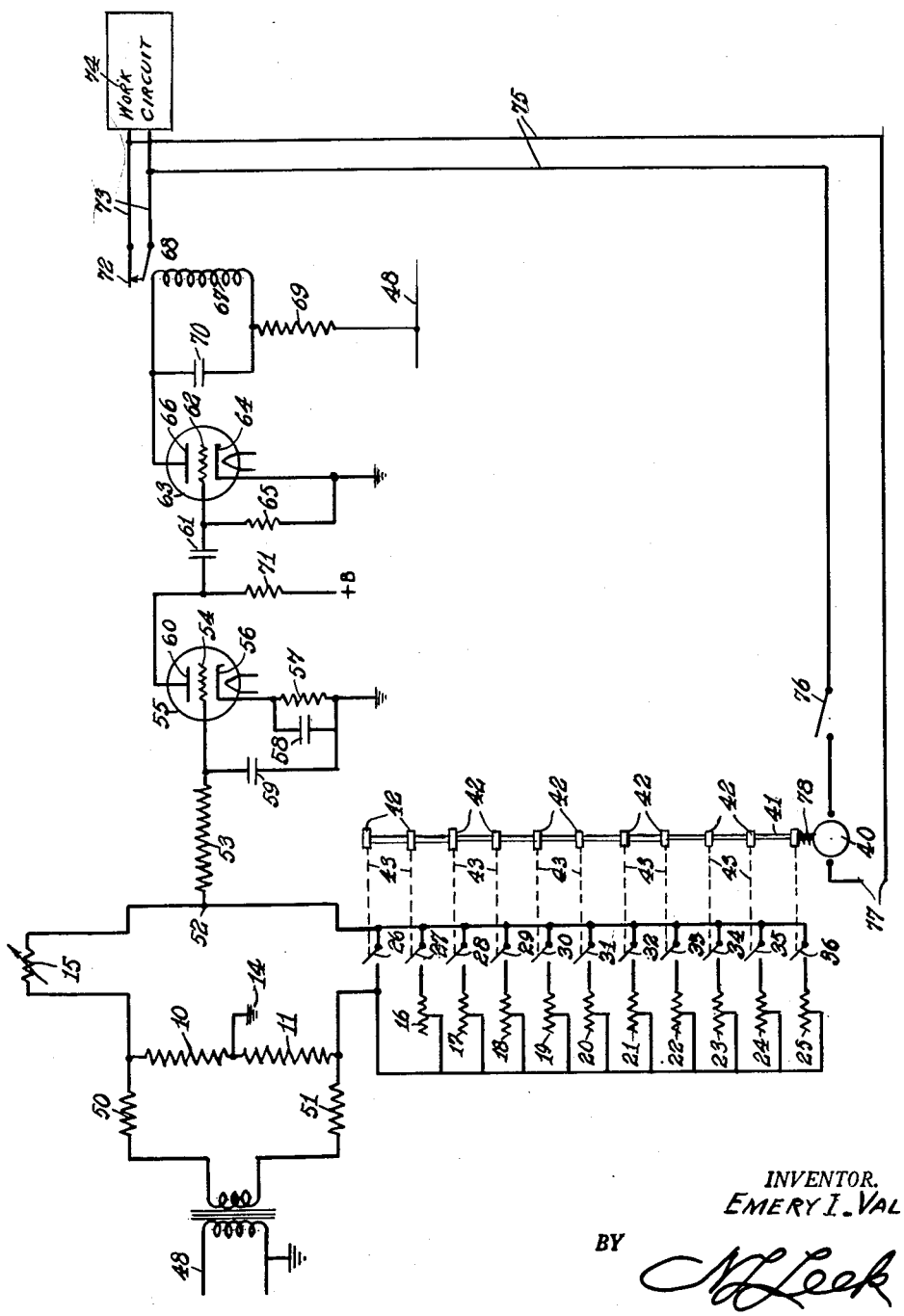
INVENTOR.
EMERY I. VALYI
BY
ATTORNEY Patented Mar. 24, 1953

2,632,508

UNITED STATES PATENT OFFICE 2,632,508

AUTOMATIC TIMING SYSTEM

Emery I. Valyi, Bronx, N. Y., assignor to A. R. D. Corporation, New York, N. Y., a corporation of New York Application June 8, 1951, Serial No. 230,566

3 Claims. (Cl. 161—1)

This invention relates to an automatic timing system and more particularly to a system wherein the timed period is a function of a variable quantity. In one embodiment the invention provides a timed control for a process step wherein the timed period varies inversely as the temperature at which the step is carried out. For example the invention is applicable to a molding process wherein a definite period of treatment must be maintained which varies with the temperature. The invention may also be embodied in timing systems which are responsive to other conditions, such as pressures, mechanical size, liquid level, etc.

An object of the invention is to provide a system of the above type which is accurate and dependable in operation and is suited to commercial use.

Various other objects and advantages will be apparent as the nature of the invention is more fully disclosed.

In a specific embodiment a closed electrical bridge circuit is used having two fixed resistance arms and two variable resistance arms. One variable arm includes a variable timing resistance the value of which is progressively adjustable in a timed cycle and the other variable arm includes a control resistance which is varied in value in response to the condition being measured.

During the timing cycle the timing resistance is varied progressively in value from a limiting value to a value which equals that of the control resistance at which time a relay circuit is actuated. The elapsed time from the beginning of the cycle to the operation of the relay circuit constitutes the timed period and varies with changes in value of the control resistance. The relay circuit may be used to terminate the process step or to produce a signal to indicate that the process step should be terminated.

The nature of the invention will be better understood by referring to the following description taken in connection with the accompanying drawing in which a specific embodiment thereof has been set forth for purposes of illustration.

In the drawing the single figure is a schematic diagram of a control circuit illustrating one embodiment of the invention.

Referring to the drawing more in detail the circuit consists essentially of a closed resistance bridge of the Wheatstone bridge type having two fixed arms comprising resistors 10 and 11 respectively, the junction between resistors 10 and 11 being grounded at 14. The bridge also includes two variable arms one of which comprises a variable control resistor 15, the resistance of which is variable in response to the condition being measured. In a temperature responsive system for example the resistor 15 may be of the type known as a thermistor, the resistance of which varies as an inverse function of the temperature to which it is subjected, or the resistor may constitute a rheostat connected to be mechanically adjusted by a temperature responsive element. In the case of a pressure responsive system the resistor may be connected to be varied in response to a pressure responsive element, or may comprise a wire gauge the stretch of which may be used as a measure of mechanical size.

The second variable arm in the closed bridge comprises a plurality of resistors 16 to 25 shown as rheostats having variable taps for adjustment purposes, each resistor 16 to 25 being connected in series with an individual switch 26 to 36 respectively, the resistors and switches being connected in parallel between the resistors 11 and 15. A switch 26 is connected across the resistor assembly to permit the effective resistance of the second variable arm to be reduced to a minimum value near zero.

Means is provided for closing and opening the switches 26 to 36 in timed sequence and in overlapping time relationship so that each switch is closed just before the preceding switch is opened so as to avoid open circuit conditions during the timing cycle. This means is shown as comprising a motor 40 driving a shaft 41 carrying a plurality of cams 42 which actuate links 43 connected to close and open the individual switches 26 to 36 respectively. The cams are so arranged that as the motor 40 rotates the shaft 41, the switch 26 is first closed, then the switch 27 is closed and the switch 26 opened and so on until the last switch 36 is closed unless the cycle is terminated sooner. The rheostats 16 to 25 are set to have different resistances that increase progressively in a predetermined pattern from the rheostat 16 to the rheostat 25 over the range of the control resistor 15 to be measured.

An alternating voltage is applied across one diagonal of the bridge from a 60 cycle line 48 through transformer 49 and resistors 50 and 51. The junction 52 of the variable arms of the bridge is connected through resistor 53 to the control grid 54 of an amplifier tube 55 having a cathode 56 grounded through a resistor 57 and a condenser 58 in parallel. A filter condenser 59 is connected between the grid 54 and cathode 56 of the tube 55 for removing high frequency disturbances. The capacity of condenser 59 however should not be sufficiently large to appreciably attenuate the transmission of the 60 cycle voltage to the grid of the tube 55.

The tube 55 includes an anode 60 which is connected through a condenser 61 to the control grid 62 of a gas filled tube 63 of the thyratron type, having a cathode 64 which is grounded and connected to the grid 62 through a resistor 65. The anode 66 of the gas tube 63 is connected through the winding 67 of a relay 68 and through resistor 69 to the 60 cycle alternating current supply line 48. A filter condenser 70 is connected across the coil 67. The anode 60 of the tube 55 is connected to a suitable source of positive plate potential through a resistor 71. The relay coil 67 is adapted when energized to open contact 72 which is connected in line 73 which controls a work circuit 74 and a motor control circuit 75, the latter having a control switch 76 and power terminals 77. The work circuit 74 may actuate a signal or may energize a control circuit connected to terminate the process step which is being timed. The cam shaft may be reset at the start of each timing cycle by a reset spring 78. In the operation of this device the resistor 15 is positioned to be responsive to the condition being measured, and the rheostats 16 to 25 are adjusted to conform to the time function of the process step to which the resistor 15 is responsive. To start the timing cycle the switch 76 is closed to energize the motor 40. In the initial position of the motor 40 the switch 26 is closed thereby putting the minimum resistance in the timing arm of the bridge circuit. As the motor continues to operate the switch 27 is next closed and the switch 26 opened. Thereafter the switches 27 to 35 are progressively closed and opened in sequence to increase progressively the resistance placed in the timing arm of the bridge.

At the beginning of the timing cycle, with the switch 26 closed, the bridge will be highly unbalanced and a comparatively large A. C. output signal will be applied to the grid 54 of the tube 55, the polarity of which will be the same as that at the junction of resistors 51 and 11. As the cam shaft 41 continues to turn and the resistance in the timing arm progressively increases, the value of this A. C. voltage progressively decreases, becoming zero when a point of balance is reached in the resistances of the two variable arms. Thereafter the voltage reverses in polarity and increases from zero to a maximum value as the resistance introduced by the motor 40 increases beyond the value of the resistor 15.

Since the plate of the gas tube 63 is energized from an alternating current which is in phase with the alternating current applied across the bridge, no plate current will flow during the initial unbalance of the bridge because the grid 62 will be negative when the plate 66 is positive, and vice versa. However, when the polarity of the grid potential 62 reverses the grid 62 will become positive. At the same time the plate 66 becomes positive, thereby causing the gas tube 63 to pass current through the winding of the relay 68 and open the relay contact 72. When this occurs the motor 40 is stopped and the work circuit 73 is actuated to terminate the process step.

The spring 78 then automatically resets the cam shaft 41 to its initial position.

It is noted that the timing is determined by the time required for the motor 40 to bring the resistance of the timing arm from its minimum value to a resistance which equals or exceeds that of the control resistor 15. Hence the timing is a function of the value of the control resistor 15. If it is desired for example that the timing be an inverse function of temperature, then the control resistor 15 will be connected to have a value inversely proportional to temperature.

Obviously the motor control may be replaced by any suitable circuit to close and open the switches 26 to 36 in timed sequence, such as by timed relays. Also the rheostats 16 to 25 may be set to decrease the resistance progressively from a value higher than that of the control resistor 15, or the switches may be closed in succession to introduce more resistors in parallel until the total resistance is reduced to the value of the control resistor. Suitable adjustments and controls are also included as will be readily understood by those skilled in the art to which this invention is applicable.

What is claimed is:

1. A time control system for measuring a time period which varies as a function of a variable condition, comprising a closed electrical bridge circuit having a pair of variable resistance arms, one of said arms comprising a control resistor which is adapted to vary in response to variations in said condition, the other of said arms comprising a plurality of timing resistors of progressively increasing resistance, timed means connecting said last resistors in succession in said last arm as a predetermined function of time, means supplying an A. C. voltage across said bridge circuit, means deriving from said bridge circuit an A. C. voltage the polarity of which changes as the direction of unbalance between said arms changes during the timing cycle, and an output circuit responsive to said change in polarity.

2. A time control system as set forth in claim 1 in which said timed means comprises a motor and switches actuated thereby in overlapping sequence.

3. A time control system for measuring a time period which varies as a function of a variable condition, comprising a closed electrical bridge circuit having a pair of variable resistance arms, one of said arms comprising a control resistor which is adapted to vary in response to variations in said condition, the other of said arms comprising a plurality of timing resistors of progressively increasing resistance, timed means connecting said last resistors in succession in said last arm as a predetermined function of time, means supplying an A. C. voltage across said bridge circuit, means deriving from said bridge circuit an A. C. voltage the polarity of which changes as the direction of unbalance between said arms changes during the timing cycle, an output circuit comprising a gas tube having anode and control grid, means supplying said anode with an A. C. voltage in phase with said first supply means, means supplying said derived voltage to said grid, and a relay connected to be actuated in response to operation of said tube, said relay being connected to stop the operation of said timed means, and spring means is provided to return said timed means to its initial position.

EMERY I. VALYI.

REFERENCES CITED

The following references are of record in the file of this patent:

UNITED STATES PATENTS

| Number | Name | Date |
| --- | --- | --- |
| 2,414,467 | Hunt | Jan. 21, 1947 |